(12) United States Patent
Zeng

(10) Patent No.: US 12,448,269 B2
(45) Date of Patent: Oct. 21, 2025

(54) LIQUID DISCHARGE CONTROL METHOD, DRINKING WATER APPARATUS, AND STORAGE MEDIUM

(71) Applicant: BEIJING XIAOMI MOBILE SOFTWARE CO., LTD., Beijing (CN)

(72) Inventor: Ke Zeng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 95 days.

(21) Appl. No.: 18/477,315

(22) Filed: Sep. 28, 2023

(65) Prior Publication Data
US 2025/0002318 A1    Jan. 2, 2025

(30) Foreign Application Priority Data

Jun. 30, 2023  (CN) .......................... 202310802811.2

(51) Int. Cl.
 *B67D 1/00* (2006.01)
 *B67D 1/08* (2006.01)
(52) U.S. Cl.
 CPC ......... *B67D 1/0005* (2013.01); *B67D 1/0878* (2013.01)
(58) Field of Classification Search
 CPC .. B67D 1/0005; B67D 1/0878; B67D 1/0007; A47J 31/525; A47J 31/4482
 See application file for complete search history.

(56) References Cited

U.S. PATENT DOCUMENTS

| | | | |
|---|---|---|---|
| 2008/0105331 A1 | 5/2008 | You et al. | |
| 2012/0138629 A1* | 6/2012 | Ashrafzadeh | B67D 1/0858 222/1 |
| 2013/0228250 A1* | 9/2013 | Agam | G01S 7/527 141/83 |
| 2015/0305548 A1* | 10/2015 | Girault | G06K 7/1421 99/283 |
| 2018/0201492 A1 | 7/2018 | Jung et al. | |

FOREIGN PATENT DOCUMENTS

CN    110720840 A    1/2020

OTHER PUBLICATIONS

Extended European Search Report issued May 10, 2024 in European Patent Application No. 23206811.4, 7 pages.
Chinese Office Action dated Jun. 19, 2025, issued in Chinese Patent Application No. 202310802611.2 (with English translation).

* cited by examiner

*Primary Examiner* — Jason K Niesz
(74) *Attorney, Agent, or Firm* — Oblon, McClelland, Maier & Neustadt, L.L.P.

(57) ABSTRACT

A liquid discharge control method includes acquiring a cup height of a cup in response to detecting that a cup is placed in a preset position, controlling a liquid outlet to open for liquid discharge in response to receiving a liquid discharge instruction; acquiring a real-time liquid level height in the cup during the liquid discharge, and controlling the liquid outlet to open or close based on the cup height and the real-time liquid level height.

7 Claims, 7 Drawing Sheets

LIQUID DISCHARGE CONTROL METHOD, DRINKING WATER APPARATUS, AND STORAGE MEDIUM

CROSS-REFERENCE TO RELATED APPLICATION

This application is based on and claims priority to Chinese Patent Application No. 202310802811.2 filed on Jun. 30, 2023, the entire contents of which are incorporated herein by reference for all purposes.

BACKGROUND

Technical Field

With the development of science and technology and the improvement of people's living standards, water purifiers, water dispensers, net drinking machines, coffee machines, fruit juice machines, milk tea machines and other drinking water apparatuses are increasingly appearing in people's daily lives. At present, some drinking water apparatus in the market are equipped with the technology of preventing the cup from being full of water, that is, the so-called technology of stopping discharging water when the cup is full, which can improve the efficiency of drinking water for the user and avoid the potential safety hazard and the waste of water resources caused by the failure to stop discharging water in time when the cup is full. The non-contact liquid level measurement technology in the related art may be roughly divided into two categories, i.e. one is to identify the liquid level in the cup based on the image processing technology, and the other is to measure the liquid level height in the cup by the infrared sensor.

SUMMARY

The present disclosure relates to a field of intelligent electrical appliances, and in particular to a liquid discharge control method, a drinking water apparatus and a storage medium.

According to a first aspect of embodiments of the present disclosure, there is provided a liquid discharge control method, which includes: acquiring a cup height of a cup in response to detecting that a cup is placed in a preset position; controlling a liquid outlet to open for liquid discharge in response to receiving a liquid discharge instruction; acquiring a real-time liquid level height in the cup during the liquid discharge; and controlling the liquid outlet to open or close based on the cup height and the real-time liquid level height.

According to a second aspect of embodiments of the present disclosure, a drinking water apparatus is provided. The drinking water apparatus includes a body. The body includes a liquid circulation pipeline and a liquid outlet communicated with the liquid circulation pipeline. The body further includes a height detection module, a liquid level detection module, a liquid discharge control component, a processor and a memory for storing computer programs. The height detection module is configured to detect a cup height of a cup, the liquid level detection module is configured to detect a liquid level height in the cup, and the liquid discharge control component is configured to control the liquid outlet to open or close. When executing the computer programs, the processor is configured to: acquire the cup height of the cup in response to detecting that the cup is placed in a preset position; control the liquid outlet to open for liquid discharge in response to receiving a liquid discharge instruction; acquire a real-time liquid level height in the cup during the liquid discharge, and control the liquid outlet to open or close based on the cup height and the real-time liquid level height.

According to a third aspect of embodiments of the present disclosure, there is provided a non-transitory computer-readable storage medium storing computer programs thereon. When executed by a processor, the computer programs are configured to acquire a cup height of a cup in response to detecting that the cup is placed in a preset position, control a liquid outlet to open for liquid discharge in response to receiving a liquid discharge instruction, acquire a real-time liquid level height in the cup during the liquid discharge, and control the liquid outlet to open or close based on the cup height and the real-time liquid level height.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and serve to explain the principles of the present disclosure together with the specification.

DETAILED DESCRIPTION OF THE PREFERRED EMBODIMENTS

Reference will now be made in detail to embodiments, examples of which are illustrated in the accompanying drawings. When the following description refers to the drawings, unless otherwise indicated, the same numbers in different drawings indicate the same or similar elements. The embodiments described in the following embodiments do not represent all embodiments consistent with the present disclosure. Rather, they are merely examples of devices and methods consistent with some aspects of the present disclosure.

A drinking water apparatus has a function of preventing a cup from being full of water, that is, stopping discharging water when the cup is full. A non-contact liquid level measurement includes identifying a liquid level in the cup based on an image processing technology, or measuring a liquid level height in the cup by an infrared sensor.

No matter based on the image processing technology or the infrared sensor, the liquid level in the cup is measured from directly above the cup based on a specified liquid level height. However, different cups may have different heights. If the height of the cup is too low, there is a hidden danger of water overflow based on the above liquid level measurement. Moreover, if the specified liquid level height is raised, it will waste resources, and also will be unfriendly to the elderly and children who take hot drinks, thus tending to cause potential safety hazards.

Therefore, embodiments of the present disclosure can provide at least the following solutions to address the above problems.

Figure 1:
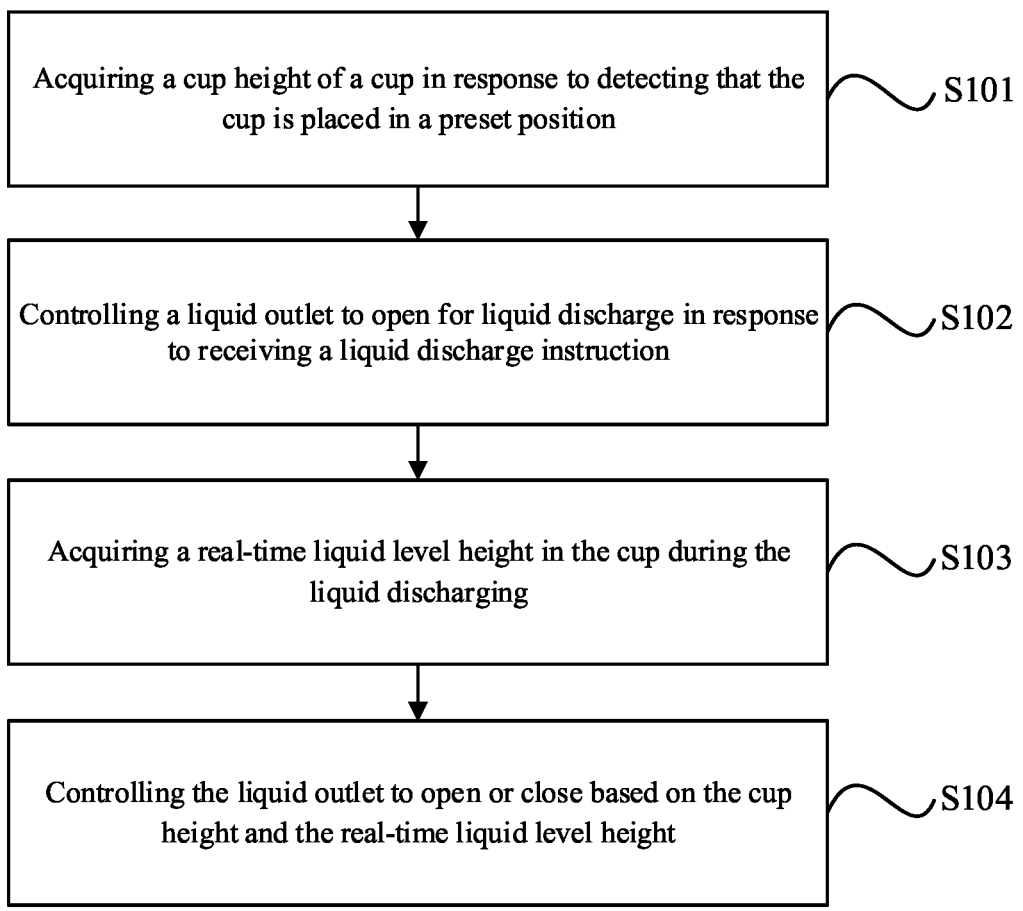
FIG. 1 is a flow chart of a liquid discharge control method according to an embodiment of the present disclosure.

FIG. 1 is a flow chart of a liquid discharge control method according to an embodiment. The method of this embodiment may be applied to a drinking water apparatus (e.g., a water purifier, a water dispenser, a net drinking machine, a coffee machine, a fruit juice machine, a milk tea machine, etc.).

As shown in FIG. 1, the method includes following steps S101-S104.

At step S101, a cup height of a cup is acquired in response to detecting that the cup is placed in a preset position. In this embodiment, when the drinking water apparatus detects that the cup is placed in the preset position, the cup height of the cup may be acquired. The cup may refer to a cup that is currently waiting to be filled with a liquid flowing out of a liquid outlet of the drinking water apparatus, and the type of the liquid may include water, coffee, fruit juice, milk tea or the like.

The preset position may include a liquid receiving position corresponding to the drinking water apparatus, such as a liquid receiving platform on a body of the drinking water apparatus, or a plane (such as a desktop) opposite to the liquid outlet of the drinking water apparatus. For example, the drinking water apparatus may determine whether the cup is placed in the preset position based on a distance detection manner or a weight detection manner, and then may acquire the cup height of the cup based on a height detection module.

In some embodiments, the height detection module may be set based on the actual scene needs, for example, being set as an infrared detection device, such as an infrared transceiver tube, etc., which is not limited in this embodiment.

Figure 5A:
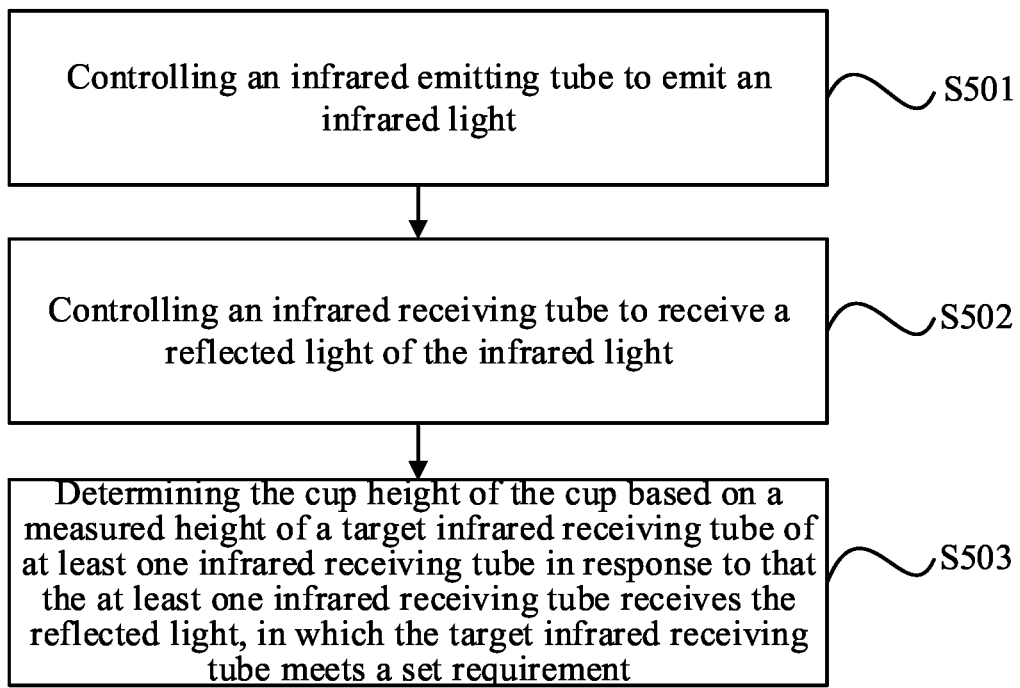
FIG. 5A is a flow chart showing how to acquire a cup height of a cup according to an embodiment of the present disclosure.

In other embodiments, the manner of acquiring the cup height of the cup may refer to the following embodiment shown in FIG. 5A, and will not be described in detail here.

At step S102, in response to receiving a liquid discharge instruction, the liquid outlet is controlled to open for liquid discharge. In this embodiment, after the user places the cup in the preset position, the user may send the liquid discharge instruction to the drinking water apparatus by clicking a physical key or a virtual key or by sending a voice instruction, and then the drinking water apparatus may respond to the instruction and control the liquid outlet of the drinking water apparatus to discharge the liquid.

It is to be noted that the specific method of controlling the liquid outlet of the drinking water apparatus to discharge the liquid may refer to explanations and illustrations in the related art, such as by controlling a valve of the liquid outlet to open, which is not limited in this embodiment.

At step S103, a real-time liquid level height in the cup is acquired during the liquid discharge. In this embodiment, after the liquid outlet is controlled to open for the liquid discharge, the real-time liquid level height in the cup may be detected based on a liquid level height detection module during the liquid discharge of the liquid outlet.

The real-time liquid level height may refer to a height of a current liquid level in the cup relative to a bottom of the cup. It may be understood that the real-time liquid level height gradually increases with the extension of time of the liquid discharge of the liquid outlet.

In some embodiments, the real-time liquid level height in the cup may be detected based on the liquid level height detection module of the drinking water apparatus. The liquid level height detection module may be set based on the actual scene needs, for example being set as a laser ranging device, such as a time-of-flight (TOF) sensor, etc., which is not limited in this embodiment.

Figure 6:
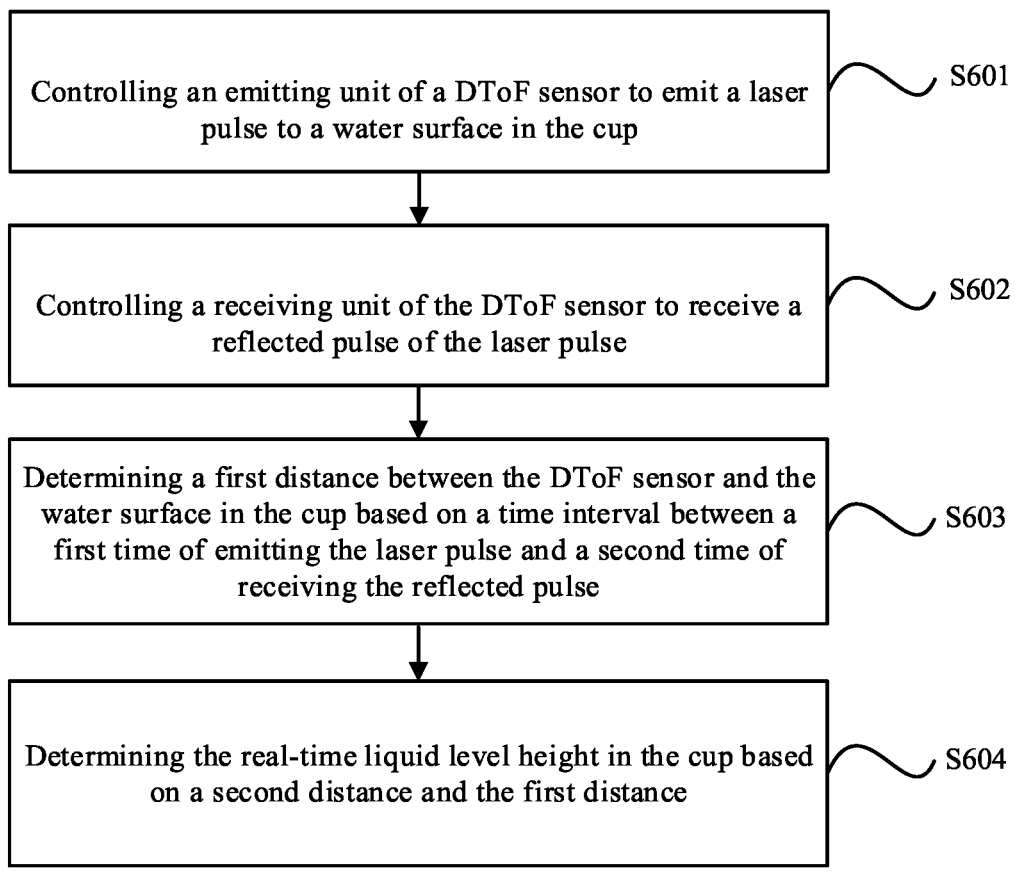
FIG. 6 is a flow chart showing how to acquire a real-time liquid level height in a cup during liquid discharge according to an embodiment of the present disclosure.

In other embodiments, the manner of acquiring the real-time liquid level height in the cup during the liquid discharge may refer to the following embodiment shown in FIG. 6, and will not be described in detail here.

At step S104, the liquid outlet is controlled to open or close based on the cup height and the real-time liquid level height. In this embodiment, after acquiring the cup height of the cup and detecting the real-time liquid level height in the cup based on the liquid level height detection module, the liquid outlet may be controlled to open or close based on the cup height and the real-time liquid level height.

For example, when the cup height and the real-time liquid level height are determined, a difference between the real-time liquid level height and the cup height may be determined in real time to control the liquid outlet to discharge the liquid or not. For example, when it is determined that the difference between the real-time liquid level height and the cup height is greater than a preset distance, the liquid outlet is controlled to open to continue the liquid discharge (for example, the liquid outlet may remain open, if it is open before it is determined that the difference between the real-time liquid level height and the cup height is greater than the preset distance, or the liquid outlet may open again, if it is closed before it is determined that the difference between the real-time liquid level height and the cup height is greater than the preset distance). When it is determined that the difference between the real-time liquid level height and the cup height is less than or equal to the preset distance, the liquid outlet is controlled to close to stop the liquid discharge. In this way, the liquid outlet can be controlled to discharge the liquid or not for cups with different heights and the real-time liquid level height, and the reasonability of controlling the liquid discharge operation can be improved.

As can be seen from the above description, the method of this embodiment acquires the cup height of the cup in response to detecting that the cup is placed in the preset position, controls the liquid outlet to open for the liquid discharge in response to receiving the liquid discharge instruction, and acquires the real-time liquid level height in the cup during the liquid discharge, so as to control the liquid outlet to open or close based on the cup height and the real-time liquid level height. Since the liquid discharge operation of the liquid outlet is jointly controlled based on the cup height of the cup and the real-time liquid level height, the liquid outlet can be controlled to discharge the liquid or not for the cups with different heights and the real-time liquid level height, and the reasonability of controlling the liquid discharge operation can be improved. Compared with the solution of the specified liquid level height in the related art, the present disclosure can avoid the overflow of the liquid due to the low cup height, the waste of resources caused by raising the specified liquid level height, and the potential safety hazard of hot drinks for the elderly and children.

Figure 2:
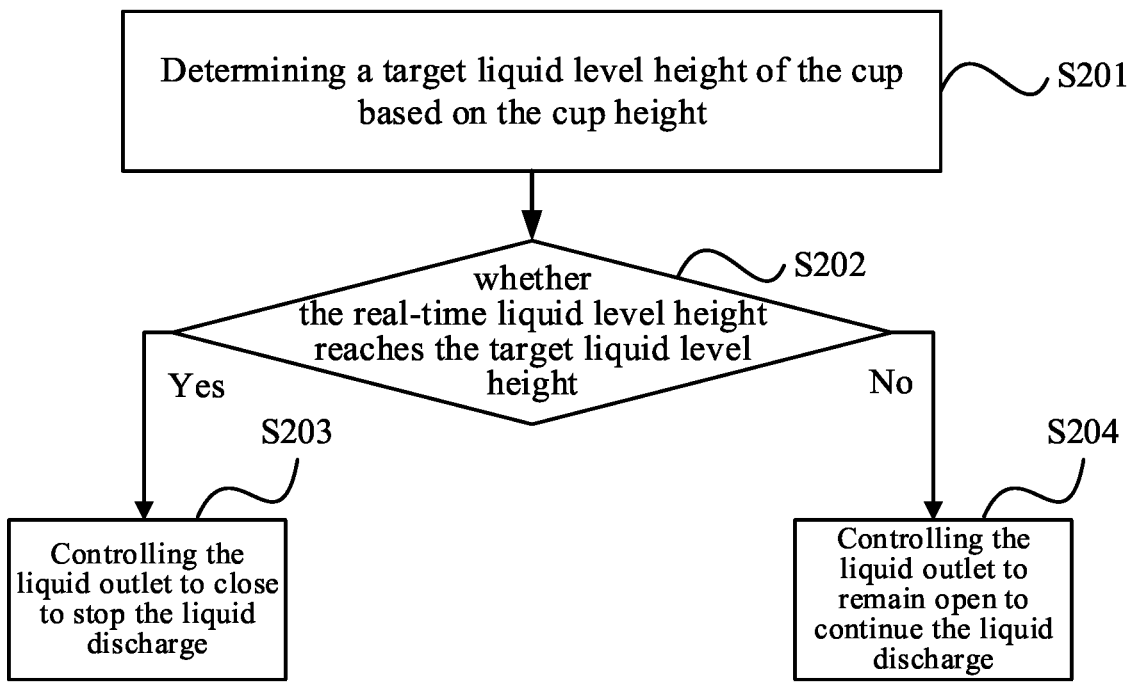
FIG. 2 is a flow chart showing how to control a liquid outlet to open or close based on a cup height and a real-time liquid level height according to an embodiment of the present disclosure.

FIG. 2 is a flow chart showing how to control the liquid outlet to open or close based on the cup height and the real-time liquid level height according to an embodiment of the present disclosure.

On the basis of the above embodiments, this embodiment takes how to control the liquid outlet to open or close based on the cup height and the real-time liquid level height as an example to make an illustrative explanation.

As shown in FIG. 2, controlling the liquid outlet to open or close based on the cup height and the real-time liquid level height in step S104 may include the following steps S201-S204.

At step S201, a target liquid level height of the cup is determined based on the cup height. In this embodiment, after determining the cup height of the cup, the target liquid level height of the cup may be determined based on the cup height. The target liquid level height may refer to a liquid level height when the cup is full.

It is to be noted that "full" in the present disclosure refers to a state when the liquid filling of the cup is finished, rather than a state where the liquid in the cup is filled to be flush with the lip of the cup. It may be understood that "stop when the cup is full" in the related art means stopping when the liquid in the cup reaches a preset height, rather than stopping when the liquid in the cup is filled to be flush with the lip of the cup.

For example, after determining the cup height of the cup, the target liquid level height may be determined based on the expected difference between the liquid level height when the cup is full and the cup height. For example, if the expected difference is 2 cm and the cup height is 15 cm, the target liquid level height may be determined based on the difference between the latter and the former (i.e., 15−2=13). Similarly, if the cup height is 8 cm, the target liquid level height may be determined to be "8−2=6 cm". It can be seen that the target liquid level height of this embodiment can be changed along with the cup height of the cup, so that the problem of the overflow of the liquid can be effectively prevented.

Figure 3:
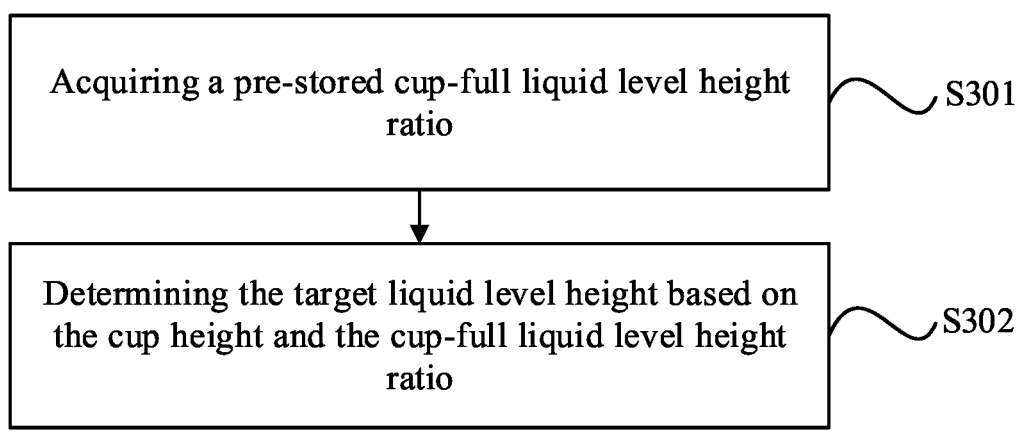
FIG. 3 is a flow chart showing how to determine a target liquid level height of a cup based on a cup height according to an embodiment of the present disclosure.

In other embodiments, the manner of determining the target liquid level height of the cup based on the cup height may also refer to the following embodiment shown in FIG. 3, and will not be described in detail here.

At step S202, it is judged whether the real-time liquid level height reaches the target liquid level height; if so, step S203 is executed, and if not, step S204 is executed.

At step S203, the liquid outlet is controlled to stop the liquid discharge.

At step S204, the liquid outlet is controlled to continue the liquid discharge. In this embodiment, after the target liquid level height of the cup is determined based on the cup height, the liquid outlet may be controlled to discharge the liquid or not by comparing the real-time liquid level height with the target liquid level height in real time. For example, when it is detected that the real-time liquid level height has not reached the target liquid level height, the liquid outlet is controlled to remain open to continue the liquid discharge. When it is detected that the real-time liquid level height has reached the target liquid level height, the liquid outlet is controlled to close to stop the liquid discharge. In this way, the liquid outlet can be controlled to discharge the liquid or not for the cups with different heights and the target liquid level height, and the reasonability of controlling the liquid discharge operation can be improved.

FIG. 3 is a flow chart showing how to determine the target liquid level height of the cup based on the cup height according to an embodiment of the present disclosure.

On the basis of the above embodiments, this embodiment takes how to determine the target liquid level height of the cup based on the cup height as an example to make an illustrative explanation.

As shown in FIG. 3, determining the target liquid level height of the cup based on the cup height in step S201 may include the following steps S301-S302.

At step S301, a pre-stored cup-full liquid level height ratio is acquired. In this embodiment, when determining the target liquid level height of the cup, the pre-stored cup-full liquid level height ratio may be acquired first.

The cup-full liquid level height ratio may be used to indicate a ratio of the liquid level height when the cup is full to the cup height.

For example, if the cup-full liquid level height ratio is P, the liquid level height when the cup is full is H, and the cup height is L, it may be determined that when the cup is full, the ratio of the liquid level height H to the cup height L, that is, H/L, is P.

It is to be noted that the cup-full liquid level height ratio may be set based on actual application scenarios or user's needs, such as 80%, etc., which is not limited in this embodiment.

Figure 4:
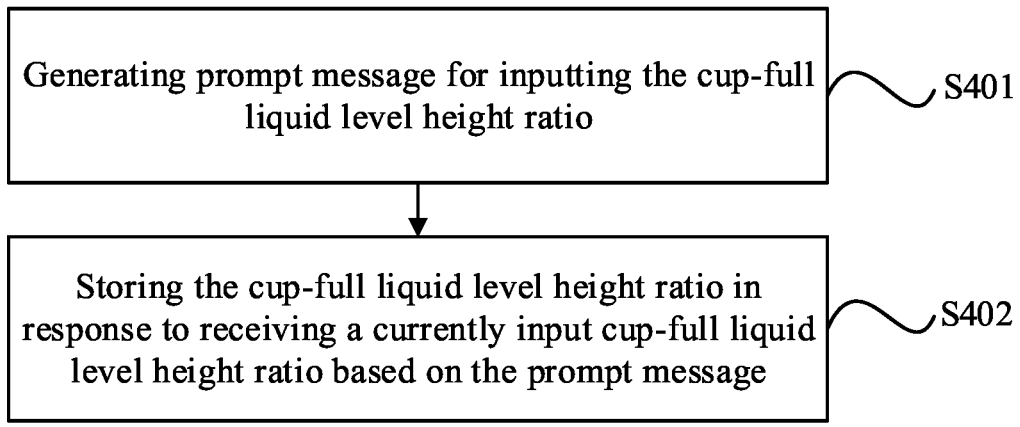
FIG. 4 is a flow chart showing how to pre-store a cup-full liquid level height ratio according to an embodiment of the present disclosure.

In another embodiment, the manner of acquiring the cup-full liquid level height ratio may refer to the following embodiment shown in FIG. 4, and will not be described in detail here.

At step S302, the target liquid level height is determined based on the cup height and the cup-full liquid level height ratio. In this embodiment, after the pre-stored cup-full liquid level height ratio is acquired, the target liquid level height can be determined based on the cup height and the cup-full liquid level height ratio.

For example, when the cup height is determined to be L1 and the cup-full liquid level height ratio is P, the target level height may be determined based on the product of the cup height of the cup and the cup-full liquid level height ratio, that is, "L1*P". For example, if the cup height of the cup is 15 cm and P is 80%, the target liquid level may be determined as 15*80%=12 cm.

As can be seen from the above description, in this embodiment, the pre-stored cup-full liquid level height ratio, which is used to indicate the ratio of the liquid level height when the cup is full to the cup height, is acquired, and further the target liquid level height may be determined based on the cup height and the cup-full liquid level height ratio. The ratio of the liquid level height when the cup is full to the cup height can be reasonably limited through the pre-stored cup-full liquid level height ratio, so that the reasonability of determining the target liquid level height can be improved. Further, the liquid outlet may be subsequently controlled to discharge the liquid or not based on the target liquid level height, and thus the reasonability of controlling the liquid discharge operation can be improved.

FIG. 4 is a flow chart showing how to pre-store the cup-full liquid level height ratio according to an embodiment of the present disclosure.

On the basis of the above embodiments, this embodiment takes how to pre-store the cup-full liquid level height ratio as an example to make an illustrative explanation.

As shown in FIG. 4, the liquid discharge control method of this embodiment may further include pre-storing the cup-full liquid level height ratio based on the following steps S401-S402.

At step S401, prompt message for inputting the cup-full liquid level height ratio is generated. In this embodiment, when the cup-full liquid level height ratio is stored, the prompt message for inputting the cup-full liquid level height ratio may be generated.

The content and form of the above prompt message may be set based on the requirements of the actual application scenarios, which is not limited in this embodiment.

For example, a prompt message of "Input the cup-full liquid level height ratio" may be displayed on a screen associated with the drinking water apparatus. The screen associated with the drinking water apparatus may be a screen of the drinking water apparatus itself, or a screen of a mobile terminal device (such as the user's mobile phone, etc.) associated with the drinking water apparatus. Taking the screen of the user's mobile phone as an example of the associated screen, an application client of the drinking water apparatus may be pre-installed in the mobile phone, and thus when the user needs to set the cup-full liquid level height ratio in the drinking water apparatus, an setting option in the application client may be triggered to input the cup-full liquid level height ratio meeting the user's own needs based on the prompt message displayed on a user interface of the client.

At step S402, in response to receiving the currently input cup-full liquid level height ratio based on the prompt message, the cup-full liquid level height ratio is stored.

For example, after generating the prompt message for inputting the cup-full liquid level height ratio, the user may input the cup-full liquid level height ratio in a provided input interface based on the prompt message. Further, the drinking water apparatus may store the cup-full liquid level height ratio locally in the drinking water apparatus in response to receiving the cup-full liquid level height ratio.

On this basis, when the pre-stored cup-full liquid level height ratio needs to be acquired later, the pre-stored cup-full liquid level height ratio may be read from the drinking water apparatus locally, and the target liquid level height may be determined based on the cup-full liquid level height ratio. Since the cup-full liquid level height ratio meets the user's own needs, the target liquid level height determined based on the cup-full liquid level height ratio also meets the user's own needs, thus improving the reasonability of determining the target liquid level height.

As can be seen from the above description, in this embodiment, the prompt message for inputting the cup-full liquid level height ratio is generated, and in response to receiving the currently input cup-full liquid level height ratio based on the prompt message, the cup-full liquid level height ratio is stored locally in the drinking water apparatus, so that the cup-full liquid level height ratio can be set based on the user's own needs, and the reasonability of the cup-full liquid level height ratio can be improved. Further, when the pre-stored cup-full liquid level height ratio needs to be acquired later, the pre-stored cup-full liquid level height ratio may be read from the drinking water apparatus locally, so that the reasonability of determining the target liquid level height based on the cup-full liquid level height ratio can be improved, and the reasonability of controlling the liquid discharge operation can be further improved.

Figure 5B:
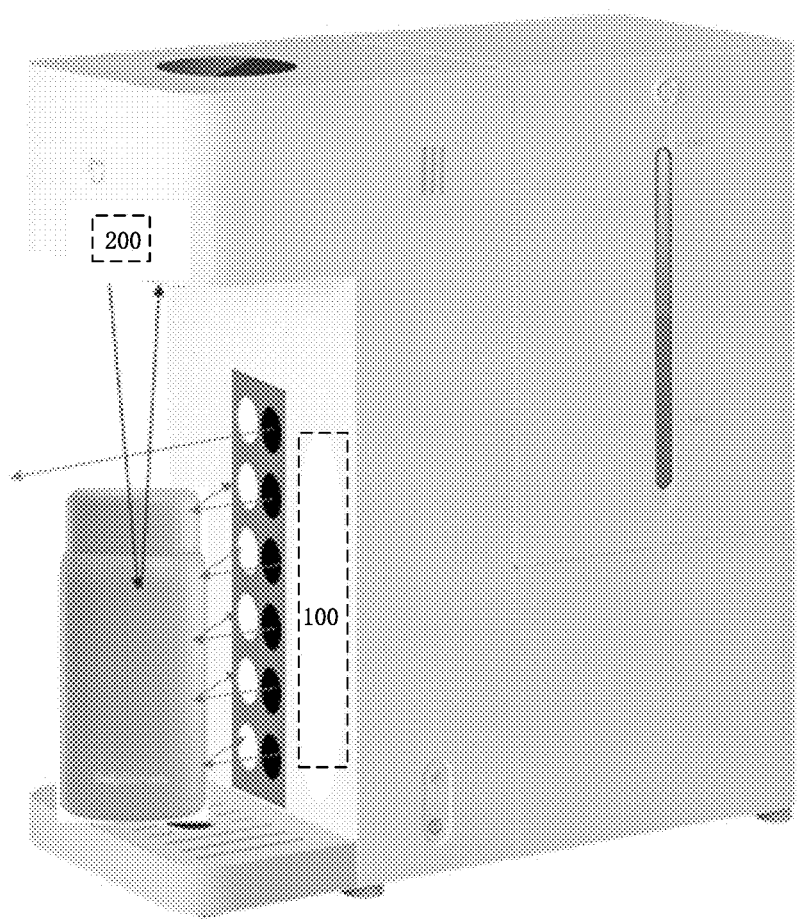
FIG. 5B is a schematic view of a drinking water apparatus according to an embodiment of the present disclosure.

FIG. 5A is a flow chart showing how to acquire the cup height of the cup according to an embodiment of the present disclosure. FIG. 5B is a schematic view of a drinking water apparatus according to an embodiment of the present disclosure. On the basis of the above embodiments, this embodiment takes how to acquire the cup height of the cup as an example to make an illustrative explanation.

As shown in FIG. 5B, the height detection module of this embodiment may include a plurality of groups of infrared transceiver tubes 100 longitudinally arranged on the drinking water apparatus, each group of infrared transceiver tubes may include an infrared emitting tube (i.e., a black dot shown in FIG. 5B) and an infrared receiving tube (i.e., a white dot shown in FIG. 5B) arranged transversely, and the two arrows "?" connected end to end, which are shown on each group of infrared transceiver tubes, represent the propagation path of infrared light emitted by the infrared emitting tube in this group of infrared transceiver tubes after reflection on the surface of the cup. In some embodiments, as shown in FIG. 5B, the liquid level height detection module may include a direct time-of-flight (DToF) sensor 200, and the corresponding liquid level detection manner may be seen in the following embodiment shown in FIG. 6, and will not be described in detail here.

As shown in FIG. 5A, acquiring the cup height of the cup in step S101 may include the following steps S501-S503.

At step S501, the infrared emitting tube is controlled to emit infrared light. In this embodiment, when it is detected that the cup is placed in the preset position, the infrared light may be emitted outward by the infrared emitting tube in each group of infrared transceiver tubes.

At step S502, the infrared receiving tube is controlled to receive a reflected light of the infrared light. In this embodiment, after the infrared light is emitted outward by the infrared emitting tube in each group of infrared transceiver tubes, the reflected light may be received by the infrared receiving tube in each group of infrared transceiver tubes.

The reflected light includes the reflected light of the infrared light emitted by the infrared emitting tube belonging to the same group as the infrared receiving tube.

In some embodiments, the plurality of groups of infrared transceiver tubes may be controlled to transmit and receive the infrared light at the same time by programming. Or, the plurality of groups of infrared transceiver tubes are controlled to transmit and receive the infrared light in sequence from bottom to top according to their positions, that is, when the first group of infrared transceiver tubes from the bottom transmit and receive the infrared light and detect the cup, the second group of infrared transceiver tubes from the bottom are controlled to continue to transmit and receive the infrared light, and so on, until there is one group of infrared transceiver tubes not detecting the cup or the plurality of groups of infrared transceiver tubes all have transmitted and received the infrared light. Then, the infrared light transceiving process is ended. In practical applications, the above two transceiving manners may be set based on the requirements of the application scenarios, which is not limited in this embodiment.

At step S503, in response to that at least one infrared receiving tube receives the reflected light, the cup height of the cup is determined based on a measured height of a target infrared receiving tube of the at least one infrared receiving tube, and the target infrared receiving tube meets a set requirement.

In this embodiment, after at least one infrared receiving tube in the plurality of groups of infrared transceiver tubes receives the reflected light, the measured height of the target infrared receiving tube, which meets the set requirement, of the at least one infrared receiving tube may be determined, and then the cup height of the cup may be determined based on the measured height.

The set requirement may be set based on actual needs, such as the infrared receiving tube, which is in the highest position, of the at least one infrared receiving tube, which is not limited in this embodiment.

On this basis, after the measured height of the target infrared receiving tube is determined, the measured height may be determined as the cup height of the cup. The measured height of the target infrared receiving tube may be calculated based on data of the reflected light received by the target infrared receiving tube, and the specific calculation manner may refer to explanations in the related art, which will not be described in detail here.

It may be understood that the height measurement range of each group of infrared transceiver tubes may be adjusted, and theoretically may be adjusted to be very small. In this embodiment, in view of practical application requirements and costs, the height measurement range of each group of infrared transceiver tubes is set to 1 cm. For example, the height measurement range of the first group of infrared transceiver tubes from the bottom may be 5-6 cm, the height measurement range of the second group of infrared transceiver tubes from the bottom may be 6-7 cm, the height measurement range of the third group of infrared transceiver tubes from the bottom may be 7-8 cm, the height measurement range of the fourth group of infrared transceiver tubes from the bottom may be 8-9 cm, and the height measurement range of the fifth group of infrared transceiver tubes from the bottom may be 9-10 cm, and so on. On this basis, as shown in FIG. 5B, when it is determined that the infrared receiving tube in the fifth group of infrared transceiver tubes from the bottom is the target infrared receiving tube that meets the set requirement, the cup height of the cup may be determined based on the height measurement range of 9-10 cm of this group of infrared transceiver tubes. For example, the cup height of the cup may be determined as 9.5 cm, which is not limited in this embodiment.

It is to be noted that the following two functions can be realized based on the plurality of groups of infrared transceiver tubes.

On one hand, it can be detected whether the cup is placed in the preset position (that is, the data received by the infrared receiving tube when the cup is detected in the preset position is different from the data received by the infrared receiving tube when the cup is not detected in the preset position, so it can be detected whether the cup is placed in the preset position accordingly), so that an additional gravity sensing device can be avoided and the manufacturing cost of the device can be reduced. On the other hand, the cup height of the current cup can be detected.

As can be seen from the above description, in this embodiment, the infrared emitting tube is controlled to emit the infrared light, the infrared receiving tube is controlled to receive the reflected light of the infrared light, and in response to that at least one infrared receiving tube receives the reflected light, the cup height of the cup is determined based on the measured height of the target infrared receiving tube, that meets the set requirement, of the at least one infrared receiving tube, so that the cup height of the cup can be accurately determined. Further, the target liquid level height can be determined subsequently based on the cup height, and the reasonability of determining the target liquid level height can be improved, so that the liquid outlet may be subsequently controlled to discharge the liquid or not based on the target liquid level height, and thus the reasonability of controlling the liquid discharge operation can be improved.

FIG. 6 is a flow chart showing how to acquire the real-time liquid level height in the cup during the liquid discharge according to an embodiment of the present disclosure. On the basis of the above embodiments, this embodiment takes how to acquire the real-time liquid level height in the cup during the liquid discharge as an example to make an illustrative explanation.

In this embodiment, the liquid level height detection module may include a direct time-of-flight (DToF) sensor (i.e., "200" as shown in FIG. 5B).

On this basis, as shown in FIG. 6, acquiring the real-time liquid level height in the cup during the liquid discharge in step S102 may include the following steps S601-S604.

At step S601, an emitting unit of the DToF sensor is controlled to emit a laser pulse to a liquid surface (for example, a water surface) in the cup.

In this embodiment, when the real-time liquid level height in the cup is to be acquired during the liquid discharge, the laser pulse may be emitted to the water surface in the cup based on the emitting unit of the DToF sensor (i.e., a laser emitter of the DToF sensor, or the like).

At step S602, a receiving unit of the DToF sensor is controlled to receive a reflected pulse of the laser pulse. In this embodiment, after the laser pulse is emitted to the water surface in the cup, the reflected pulse of the laser pulse may be received by the receiving unit of the DToF sensor (i.e., a laser receiver of the DToF sensor, or the like).

It may be understood that the time-of-flight (ToF) sensor may be a direct time-of-flight (DToF) sensor or an indirect time-of-flight (IToF) sensor. The reason why the DToF sensor is adopted in this embodiment is that the detected liquid surface may be a transparent liquid surface, but the sensitivity and accuracy of the IToF sensor are low, so it cannot meet the actual requirements. In other words, the IToF sensor may be used to measure the distance from an opaque object, while the DToF sensor may be used to detect the height of the transparent liquid surface, without measuring the distance from the bottom of the cup. The DToF sensor has high sensitivity and can accurately identify the height of the liquid surface, rather than the distance from the bottom of the cup, thus improving the accuracy of subsequent liquid discharge control.

At step S603, based on a time interval between a first time of emitting the laser pulse and a second time of receiving the reflected pulse, a first distance between the DToF sensor and the water surface in the cup is determined.

In this embodiment, after controlling the emitting unit of the DToF sensor to emit the laser pulse to the water surface in the cup and controlling the receiving unit of the DToF sensor to receive the reflected pulse of the laser pulse, based on the time interval between the first time of emitting the laser pulse and the second time of receiving the reflected pulse, that is, a time of flight (TOF), and further based on ½ of the product of the time interval and the light speed, the first distance d1 between the DToF sensor and the water surface in the cup can be determined.

At step S604, the real-time liquid level height in the cup is determined based on a second distance and the first distance. In this embodiment, after determining the first distance between the DToF sensor and the water surface in the cup, the real-time liquid level height in the cup may be determined based on the second distance and the first distance.

The second distance may be determined based on a distance between the DToF sensor and a plane where the cup is currently placed.

For example, after the second distance d2 is determined based on the distance between the DToF sensor and the plane where the cup is currently placed, the real-time liquid level height H in the cup may be determined based on a difference between the second distance d2 and the first distance d1, that is, H=d2−d1.

As can be seen from the above description, in this embodiment, the emitting unit of the DToF sensor is controlled to emit the laser pulse to the water surface in the cup, the receiving unit of the DToF sensor is controlled to receive the reflected pulse of the laser pulse, then the first distance between the DToF sensor and the water surface in the cup is determined based on the time interval between the first time of emitting the laser pulse and the second time of receiving the reflected pulse, and further, the real-time liquid level height in the cup is determined based on the second distance and the first distance, so that the real-time liquid level height in the cup can be accurately determined, and hence the liquid outlet may be subsequently controlled to open or close based on the cup height and the real-time liquid level height, thus improving the reasonability of controlling the liquid discharge operation.

Figure 7:
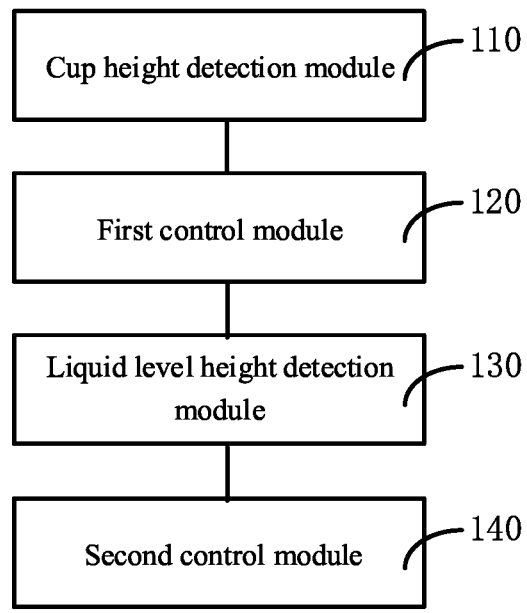
FIG. 7 is a block diagram of a liquid discharge control device according to an embodiment of the present disclosure.

FIG. 7 is a block diagram of a liquid discharge control device according to an embodiment of the present disclosure. The device of this embodiment may be applied to a drinking water apparatus (e.g., a water purifier, a water dispenser, a net drinking machine, a coffee machine, a fruit juice machine, a milk tea machine, etc.).

As shown in FIG. 7, the device includes a cup height detection module 110, a first control module 120, a liquid level height detection module 130 and a second control module 140.

The cup height detection module 110 is configured to acquire a cup height of a cup in response to detecting that the cup is placed in a preset position.

The first control module 120 is configured to control a liquid outlet to open for liquid discharge in response to receiving a liquid discharge instruction.

The liquid level height detection module 130 is configured to acquire a real-time liquid level in the cup during the liquid discharge.

The second control module 140 is configured to control the liquid outlet to open or close based on the cup height and the real-time liquid level height.

As can be seen from the above description, the device of this embodiment acquires the cup height of the cup in response to detecting that the cup is placed in the preset position, controls the liquid outlet to open for the liquid discharge in response to receiving the liquid discharge instruction, and acquires the real-time liquid level height in the cup during the liquid discharge, so as to control the liquid outlet to open or close based on the cup height and the real-time liquid level height. Since the liquid discharge operation of the liquid outlet is jointly controlled based on the cup height of the cup and the real-time liquid level height, the liquid outlet can be controlled to discharge the liquid or not for the cups with different heights and the real-time liquid level height, and the reasonability of controlling the liquid discharge operation can be improved. Compared with the solution of the specified liquid level height in the related art, the present disclosure can avoid the overflow of the liquid due to the low cup height, the waste of resources caused by raising the specified liquid level height, and the potential safety hazard of hot drinks for the elderly and children.

Figure 8:
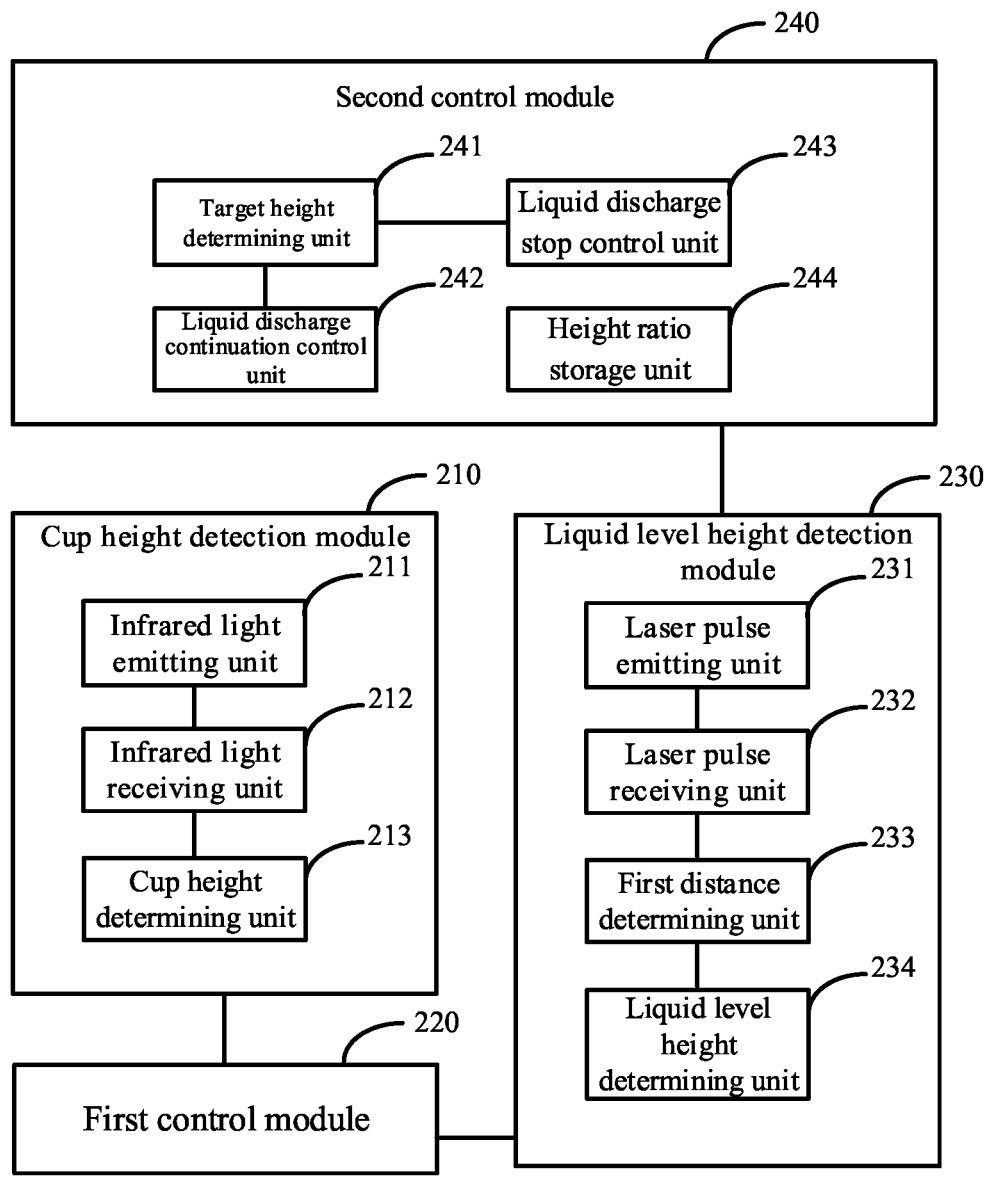
FIG. 8 is a block diagram of another liquid discharge control device according to an embodiment of the present disclosure.

FIG. 8 is a block diagram of another liquid discharge control device according to an embodiment of the present disclosure. The device of this embodiment may be applied to a drinking water apparatus (such as a water purifier, a water dispenser, a net drinking machine, a coffee machine, a fruit juice machine, a milk tea machine, etc.).

A cup height detection module 210, a first control module 220, a liquid level height detection module 230 and a second control module 240 have the same functions as the cup height detection module 110, the first control module 120, the liquid level height detection module 130 and the second control module 140 in the above embodiment shown in FIG. 7, and will not be repeated here.

As shown in FIG. 8, the second control module 240 may include: a target height determining unit 241 configured to determine a target liquid level height of the cup based on the cup height; a liquid discharge continuation control unit 242 configured to control the liquid outlet to remain open to continue the liquid discharge in response to that the real-time liquid level height does not reach a target liquid level height; or a liquid discharge stop control unit 243 configured to control the liquid outlet to close to stop the liquid discharge in response to that the real-time liquid level height reaches the target liquid level height.

In some embodiments, the target height determining unit 241 is further configured for acquiring a pre-stored cup-full liquid level height ratio, and determining the target liquid level height based on the cup height and the cup-full liquid level height ratio. The cup-full liquid level height ratio is used for indicating a ratio of a liquid level height when the cup is full to the cup height.

In some embodiments, the second control module 240 may further include a height ratio storage unit 244. The height ratio storage unit 244 may be configured for generating prompt message for inputting the cup-full liquid level height ratio, and storing the cup-full liquid level height ratio in response to receiving a currently input cup-full liquid level height ratio based on the prompt message.

In some embodiments, the cup height detection module 210 may include: an infrared light emitting unit 211 configured for controlling an infrared emitting tube to emit an infrared light; an infrared light receiving unit 212 configured for controlling an infrared receiving tube to receive a reflected light of the infrared light; and a cup height determining unit 213 configured for determining the cup height of the cup based on a measured height of a target infrared receiving tube of at least one infrared receiving tube in response to that the at least one infrared receiving tube receives the reflected light. The target infrared receiving tube meets a set requirement.

In some embodiments, the liquid level height detection module 230 may include: a laser pulse emitting unit 231 configured for controlling an emitting unit of a DToF sensor to emit a laser pulse to a water surface in the cup; a laser pulse receiving unit 232 configured for controlling a receiving unit of the DToF sensor to receive a reflected pulse of the laser pulse; a first distance determining unit 233 configured for determining a first distance between the DToF sensor and the water surface in the cup based on a time interval between a first time of emitting the laser pulse and a second time of receiving the reflected pulse; and a liquid level height determining unit 234 configured for determining the real-time liquid level height in the cup based on a second distance and the first distance. The second distance is determined based on a distance between the DToF sensor and a plane where the cup is currently placed.

With regard to the device in the above embodiment, the specific way in which each module performs operations has been described in detail in the embodiments of the method, and will not be described in detail here.

Figure 9:
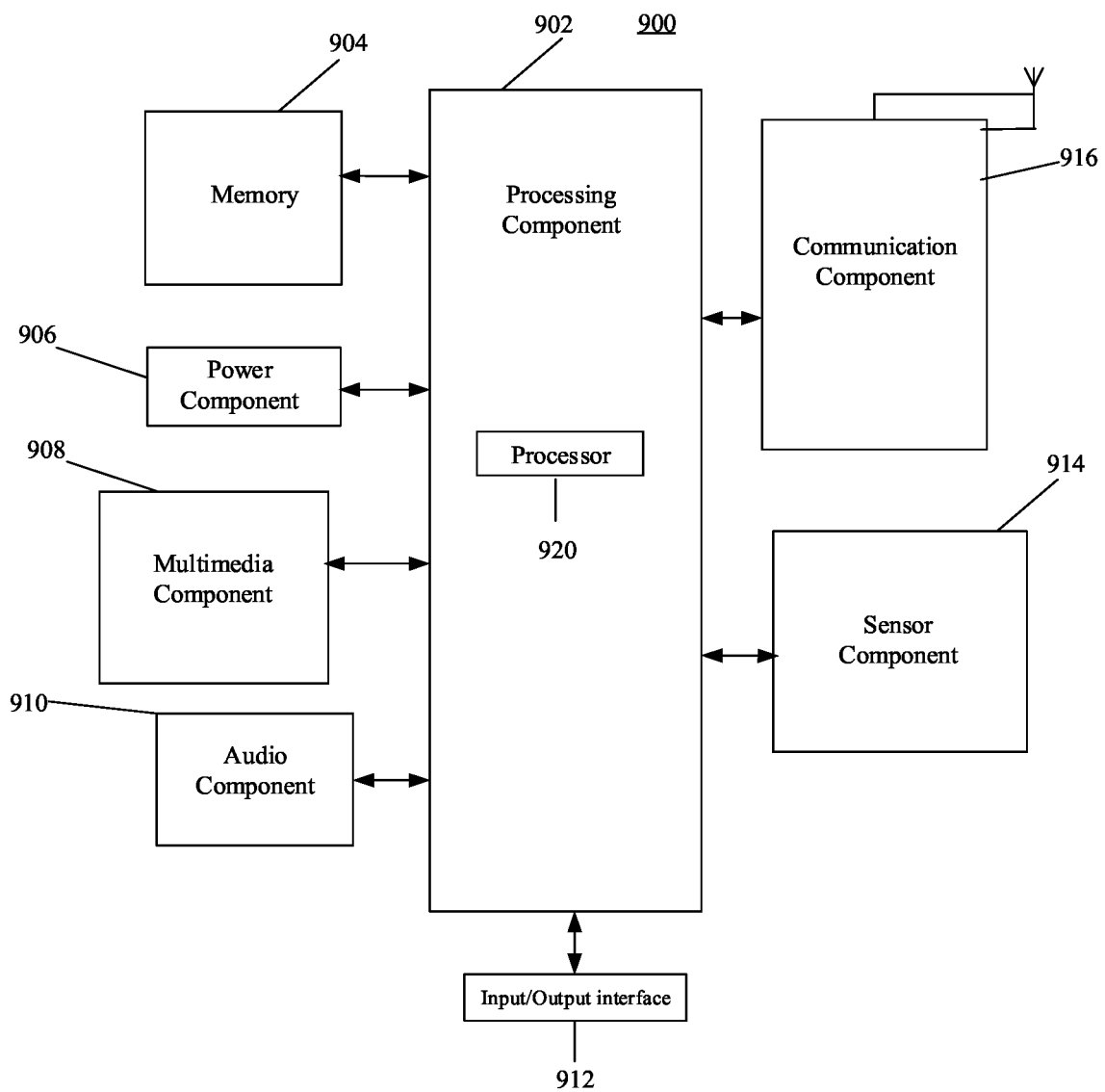
FIG. 9 is a block diagram of a drinking water apparatus according to an embodiment of the present disclosure.

FIG. 9 is a block diagram of a drinking water apparatus according to an embodiment of the present disclosure. For example, the device 900 may be a water purifier, a water dispenser, a net drinking machine, a coffee machine, a fruit juice machine, a milk tea machine, and the like.

In this embodiment, the above device may include a body, which is provided with a liquid circulation pipeline and a liquid outlet communicated with the liquid circulation pipeline, and also provided with a height detection module, a liquid level detection module, a liquid discharge control component, a processor and a memory for storing computer programs.

The height detection module is configured for detecting a cup height, the liquid level detection module is configured for detecting a liquid level height in the cup, and the liquid discharge control component is configured for controlling the liquid outlet to open or close.

When executing the computer programs, the processor is configured to: acquire a cup height of a cup in response to detecting that the cup is placed in a preset position; controlling the liquid outlet to open for liquid discharge in response to receiving a liquid discharge instruction; acquiring a real-time liquid level height in the cup during the liquid discharge; and controlling the liquid outlet to open or close based on the cup height and the real-time liquid level height.

Specifically, referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 generally controls the overall operation of the device 900, such as operations associated with display, telephone call, data communication, camera operation and recording operation. The processing component 902 may include one or more processors 920 to execute instructions to complete all or part of the steps of the liquid discharge control method of the embodiment shown in FIG. 1. In addition, the processing component 902 may include one or more modules to facilitate the interaction between the processing component 902 and other components. For example, the processing component 902 may include a multimedia module to facilitate interaction between the multimedia component 908 and the processing component 902.

The memory 904 is configured to store various types of data to support operations at the device 900. Examples of these data include instructions for any application or method operating on the device 900, contact data, phone book data, messages, pictures, videos, and the like. The memory 904 can be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 906 provides power to various components of the device 900. The power component 906 may include a power management system, one or more power supplies, and other components associated with generating, managing and distributing power for the device 900.

The multimedia component 908 includes a screen that provides an output interface between the device 900 and the user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, sliding and gestures on the touch panel. The touch sensor may not only sense the boundary of a touch or sliding action, but also detect the duration and pressure related to the touch or sliding operation. In some embodiments, the multimedia component 908 includes a front camera and/or a rear camera. When the device 900 is in an operation mode, such as a shooting mode or a video mode, the front camera and/or the rear camera may receive external multimedia data. Each of the front camera and the rear camera may be a fixed optical lens system or have a focal length and an optical zoom capability.

The audio component 910 is configured to output and/or input audio signals. For example, the audio component 910 includes a microphone (MIC) configured to receive external audio signals when the device 900 is in an operation mode, such as a call mode, a recording mode and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, which may be keyboards, clickwheels, buttons, etc. These buttons may include, but are not limited to, a home button, a volume button, a start button and a lock button.

The sensor component 914 includes one or more sensors for providing various aspects of state evaluation for the device 900. For example, the sensor component 914 may detect the on/off state of the device 900, and the relative positioning of components, such as a display and a keypad of the device 900. The sensor component 914 may also detect the position change of the device 900 or the component of the device 900, the presence or absence of contact between the user and the device 900, the orientation or acceleration/deceleration of the device 900 and the temperature change of the device 900. The sensor component 914 may also include a proximity sensor configured to detect the presence of a nearby object without any physical contact. The sensor component 914 may also include an optical sensor, such as a CMOS or CCD image sensor, for use in imaging applications. In some embodiments, the sensor component 914 may further include an acceleration sensor, a gyro sensor, a magnetic sensor, a pressure sensor or a temperature sensor.

The communication component 916 is configured to facilitate wired or wireless communication between the device 900 and other devices. The device 900 may access a wireless network based on any communication standards, such as WiFi, 2G or 3G, 4G or 5G or their combination. In an embodiment, the communication component 916 receives a broadcast signal or broadcast related information from an external broadcast management system via a broadcast channel. In an embodiment, the communication component 916 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an embodiment, the device 900 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components, for executing the liquid discharge control method of the embodiment shown in FIG. 1.

In the embodiments, there is also provided a non-transitory computer-readable storage medium including instructions, such as the memory 904 including instructions, and the instructions may be executed by the processor 920 of the device 900 to complete the liquid discharge control method of the embodiment shown in FIG. 1. For example, the non-transitory computer-readable storage medium may be ROM, random access memory (RAM), CD-ROM, magnetic tape, floppy disk, optical data storage device, etc.

Other embodiments of the present disclosure will easily occur to those skilled in the art after considering the specification and practicing the disclosure disclosed herein. The present disclosure is intended to cover any variations, uses or adaptations of the present disclosure, which follow the general principles of the present disclosure and include common sense or common technical means in the related art that are not disclosed in the present disclosure. The specification and embodiments are to be regarded as illustrative only, while the true scope and spirit of the present disclosure are indicated by the following claims.

It should be understood that the present disclosure is not limited to the precise structure described above and shown in the drawings, and various modifications and changes may be made without departing from its scope. The scope of the present disclosure is limited only by the appended claims.

What is claimed is:

1. A liquid discharge control method, comprising:
acquiring a cup height of a cup in response to detecting that a cup is placed in a preset position;
controlling a liquid outlet to open for liquid discharge in response to receiving a liquid discharge instruction;
acquiring a real-time liquid level height in the cup during the liquid discharge; and
controlling the liquid outlet to open or close based on the cup height and the real-time liquid level height,
wherein the controlling the liquid outlet to open or close based on the cup height and the real-time liquid level height comprises:
determining a target liquid level height of the cup based on the cup height;
controlling the liquid outlet to remain open to continue the liquid discharge in response to that the real-time liquid level height does not reach the target liquid level height; or
controlling the liquid outlet to close to stop the liquid discharge in response to that the real-time liquid level height reaches the target liquid level height;
wherein the determining the target liquid level height of the cup based on the cup height comprises:
acquiring a pre-stored cup-full liquid level height ratio, wherein the cup-full liquid level height ratio is configured for indicating a ratio of a liquid level height when the cup is full to the cup height;
determining the target liquid level height based on the cup height and the cup-full liquid level height ratio;

the liquid discharge control method further comprising:
generating prompt message for inputting the cup-full liquid level height ratio; and
storing the cup-full liquid level height ratio in response to receiving a currently input cup-full liquid level height ratio based on the prompt message, and
after the cup-full liquid level height ratio is stored, reading the cup-full liquid level height ratio to determine the target liquid level height.

2. The method according to claim 1, wherein the acquiring the cup height of the cup comprises:
controlling an infrared emitting tube to emit an infrared light;
controlling an infrared receiving tube to receive a reflected light of the infrared light; and
in response to that at least one infrared receiving tube receives the reflected light, determining the cup height of the cup based on a measured height of a target infrared receiving tube of the at least one infrared receiving tube, wherein the target infrared receiving tube meets a set requirement.

3. The method according to claim 1, wherein the acquiring the real-time liquid level in the cup during the liquid discharge comprises:
controlling an emitting unit of a direct time-of-flight (DToF) sensor to emit a laser pulse to a liquid surface in the cup;
controlling a receiving unit of the DToF sensor to receive a reflected pulse of the laser pulse;
determining a first distance between the DTOF sensor and the liquid surface in the cup based on a time interval between a first time of emitting the laser pulse and a second time of receiving the reflected pulse; and
determining the real-time liquid level height in the cup based on a second distance and the first distance, wherein the second distance is determined based on a distance between the DTOF sensor and a plane where the cup is currently placed.

4. A drinking water apparatus, comprising a body, wherein the body comprises a liquid circulation pipeline and a liquid outlet communicated with the liquid circulation pipeline, and the body further comprises a height detection module, a liquid level detection module, a liquid discharge control component, a processor and a memory for storing computer programs;
wherein the height detection module is configured to detect a cup height of a cup, the liquid level detection module is configured to detect a liquid level height in the cup, and the liquid discharge control component is configured to control the liquid outlet to open or close; and
wherein when executing the computer programs, the processor is configured to:
acquire the cup height of the cup in response to detecting that the cup is placed in a preset position;
control the liquid outlet to open for liquid discharge in response to receiving a liquid discharge instruction;
acquire a real-time liquid level height in the cup during the liquid discharge; and
control the liquid outlet to open or close based on the cup height and the real-time liquid level height;
wherein for controlling the liquid outlet to open or close based on the cup height and the real-time liquid level height, the processor is further configured to:
determine a target liquid level height of the cup based on the cup height;

control the liquid outlet to remain open to continue the liquid discharge in response to that the real-time liquid level height does not reach the target liquid level height; or
control the liquid outlet to close to stop the liquid discharge in response to that the real-time liquid level height reaches the target liquid level height;
wherein for determining the target liquid level height of the cup based on the cup height, the processor is further configured to:
acquire a pre-stored cup-full liquid level height ratio, wherein the cup-full liquid level height ratio is configured for indicating a ratio of a liquid level height when the cup is full to the cup height; and
determine the target liquid level height based on the cup height and the cup-full liquid level height ratio; and
the processor is further configured to:
generate prompt message for inputting the cup-full liquid level height ratio; and
store the cup-full liquid level height ratio in response to receiving a currently input cup-full liquid level height ratio based on the prompt message, and
after the cup-full liquid level height ratio is stored, read the cup-full liquid level height ratio to determine the target liquid level height.

5. The drinking water apparatus according to claim 4, wherein for acquiring the cup height of the cup, the processor is further configured to:
control an infrared emitting tube to emit an infrared light;
control an infrared receiving tube to receive a reflected light of the infrared light; and
in response to that at least one infrared receiving tube receives the reflected light, determine the cup height of the cup based on a measured height of a target infrared receiving tube of the at least one infrared receiving tube, wherein the target infrared receiving tube meets a set requirement.

6. The drinking water apparatus according to claim 4, wherein for acquiring the real-time liquid level in the cup during the liquid discharge, the processor is further configured to:
control an emitting unit of a direct time-of-flight (DToF) sensor to emit a laser pulse to a liquid surface in the cup;
control a receiving unit of the DTOF sensor to receive a reflected pulse of the laser pulse;
determine a first distance between the DToF sensor and the liquid surface in the cup based on a time interval between a first time of emitting the laser pulse and a second time of receiving the reflected pulse; and
determine the real-time liquid level height in the cup based on a second distance and the first distance, wherein the second distance is determined based on a distance between the DTOF sensor and a plane where the cup is currently placed.

7. A computer-readable storage medium, storing computer programs thereon, wherein when executed by a processor, the computer programs are configured to:
acquire a cup height of a cup in response to detecting that the cup is placed in a preset position;
control a liquid outlet to open for liquid discharge in response to receiving a liquid discharge instruction;
acquire a real-time liquid level height in the cup during the liquid discharge; and
control the liquid outlet to open or close based on the cup height and the real-time liquid level height;
wherein for controlling the liquid outlet to open or close based on the cup height and the real-time liquid level height, the computer programs are further configured to:
determine a target liquid level height of the cup based on the cup height;
control the liquid outlet to remain open to continue the liquid discharge in response to that the real-time liquid level height does not reach the target liquid level height; or
control the liquid outlet to close to stop the liquid discharge in response to that the real-time liquid level height reaches the target liquid level height;
wherein for determining the target liquid level height of the cup based on the cup height, the computer programs are further configured to:
acquire a pre-stored cup-full liquid level height ratio, wherein the cup-full liquid level height ratio is configured for indicating a ratio of a liquid level height when the cup is full to the cup height; and
determine the target liquid level height based on the cup height and the cup-full liquid level height ratio; and
the computer programs are further configured to:
generate prompt message for inputting the cup-full liquid level height ratio; and
store the cup-full liquid level height ratio in response to receiving a currently input cup-full liquid level height ratio based on the prompt message; and
after the cup-full liquid level height ratio is stored, read the cup-full liquid level height ratio to determine the target liquid level height.

\* \* \* \* \*